(12) United States Patent
Arisman

(10) Patent No.: US 7,542,926 B2
(45) Date of Patent: Jun. 2, 2009

(54) STATION FOR DISPENSING LIQUID COLORANT FOR WET CONCRETE

(75) Inventor: Mark Arisman, Springfield, IL (US)

(73) Assignee: Solomon Colors, Inc., Springfield, IL (US)

( * ) Notice: Subject to any disclaimer, the term of this patent is extended or adjusted under 35 U.S.C. 154(b) by 0 days.

(21) Appl. No.: 11/775,674

(22) Filed: Jul. 10, 2007

(65) Prior Publication Data

US 2008/0011775 A1 Jan. 17, 2008

Related U.S. Application Data

(60) Provisional application No. 60/830,030, filed on Jul. 11, 2006.

(51) Int. Cl.
G06Q 30/00 (2006.01)

(52) U.S. Cl. .............................. 705/26; 705/28; 705/22

(58) Field of Classification Search ........................ None
See application file for complete search history.

(56) References Cited

U.S. PATENT DOCUMENTS

| 4,204,876 | A | | 5/1980 | Bowden | |
|---|---|---|---|---|---|
| 5,154,314 | A | * | 10/1992 | Van Wormer | 222/1 |
| 5,268,849 | A | * | 12/1993 | Howlett et al. | 700/226 |
| 6,576,280 | B2 | * | 6/2003 | Bebiak et al. | 426/232 |
| 6,715,514 | B2 | * | 4/2004 | Parker et al. | 141/1 |
| 6,910,796 | B2 | | 6/2005 | Bailey et al. | |
| 6,959,284 | B1 | * | 10/2005 | Howes | 705/26 |
| 2001/0037255 | A1 | * | 11/2001 | Tambay et al. | 705/26 |
| 2003/0216972 | A1 | | 11/2003 | Gotou et al. | |
| 2003/0234461 | A1 | | 12/2003 | Fortin et al. | |
| 2004/0121082 | A1 | | 6/2004 | Dunnous et al. | |
| 2005/0160077 | A1 | * | 7/2005 | Howes | 707/2 |

OTHER PUBLICATIONS

Wasserman et al., Mining everyone's business, Brandweek, vol. 41 No. 9, p. 32, Feb. 28, 2000.*
Bovet et al., "Value nets: reinventing the rusty supply chain for competitive advantage", Strategy & Leadership, vol. 28 No. 4, p. 21, Jul./Aug. 2000.*
International Search Report and Written Opinion for PCT/US2007/73227 dated Sep. 5, 2008 (6 pages).

* cited by examiner

*Primary Examiner*—F. Zeender
*Assistant Examiner*—Christopher Buchanan
(74) *Attorney, Agent, or Firm*—Brian B. Diekhoff; Polsinelli Shughart PC

(57) ABSTRACT

Systems and methods for the advanced batching of liquid colorant for dispensing into loads of wet concrete are described. A color station makes the batches of liquid colorant at the direction of a central authority. The color station includes numerous different liquid colorants that are combined to form a specific color of liquid colorant. The color station is in contact with the central authority and receives and transmits information and data to and from the central authority. Proximity detection is used to initiate the processing of the batches of liquid colorant.

27 Claims, 7 Drawing Sheets

STATION FOR DISPENSING LIQUID COLORANT FOR WET CONCRETE

This Application claims the benefit of U.S. Provisional Application No. 60/830,030 filed Jul. 11, 2006.

FIELD OF INVENTION

Systems and methods for the advanced batching of liquid colorant for dispensing into loads of wet concrete are described.

SUMMARY OF INVENTION

Systems and methods for the advanced batching of liquid colorant for dispensing into loads of wet concrete are described. The method includes providing a color station that makes batches of liquid colorant. The color station includes a supply of numerous different liquid colorants that are combined to form a specific color of liquid colorant. The color station is in contact with a central authority and receives and transmits information and data to and from the central authority.

In general, an order for a batch of liquid colorant is placed by a customer or by the central authority, who operates the color station, after receiving a request by the customer. The order is maintained in a pending status until the customer is ready to take delivery of the liquid colorant. The color station detects the customer, for example, by the customer calling the central authority. The color station then begins processing the batch of the liquid colorant and delivers the batch of liquid colorant to the customer at the color station.

The color station includes a weigh chamber where the different liquid colorants are received that are needed to make the batch of liquid colorant. A least one tote containing a liquid colorant is in fluidic communication with the weigh chamber. One or more pumps transfer the liquid colorant from the tote or totes to the weigh chamber. Hoses and pumps in communication with the weigh chamber dispense the liquid colorant to a concrete truck of the customer via booms on the exterior of the color station. An internal control panel operates the pumps and other mechanical features of the color station. A control processor manages the color station and is in communication with the central authority and receives commands from the central authority. The control processor further transmits status and operational information regarding the color station to the central authority.

DETAILED DESCRIPTION OF THE INVENTION

Figure 1A:
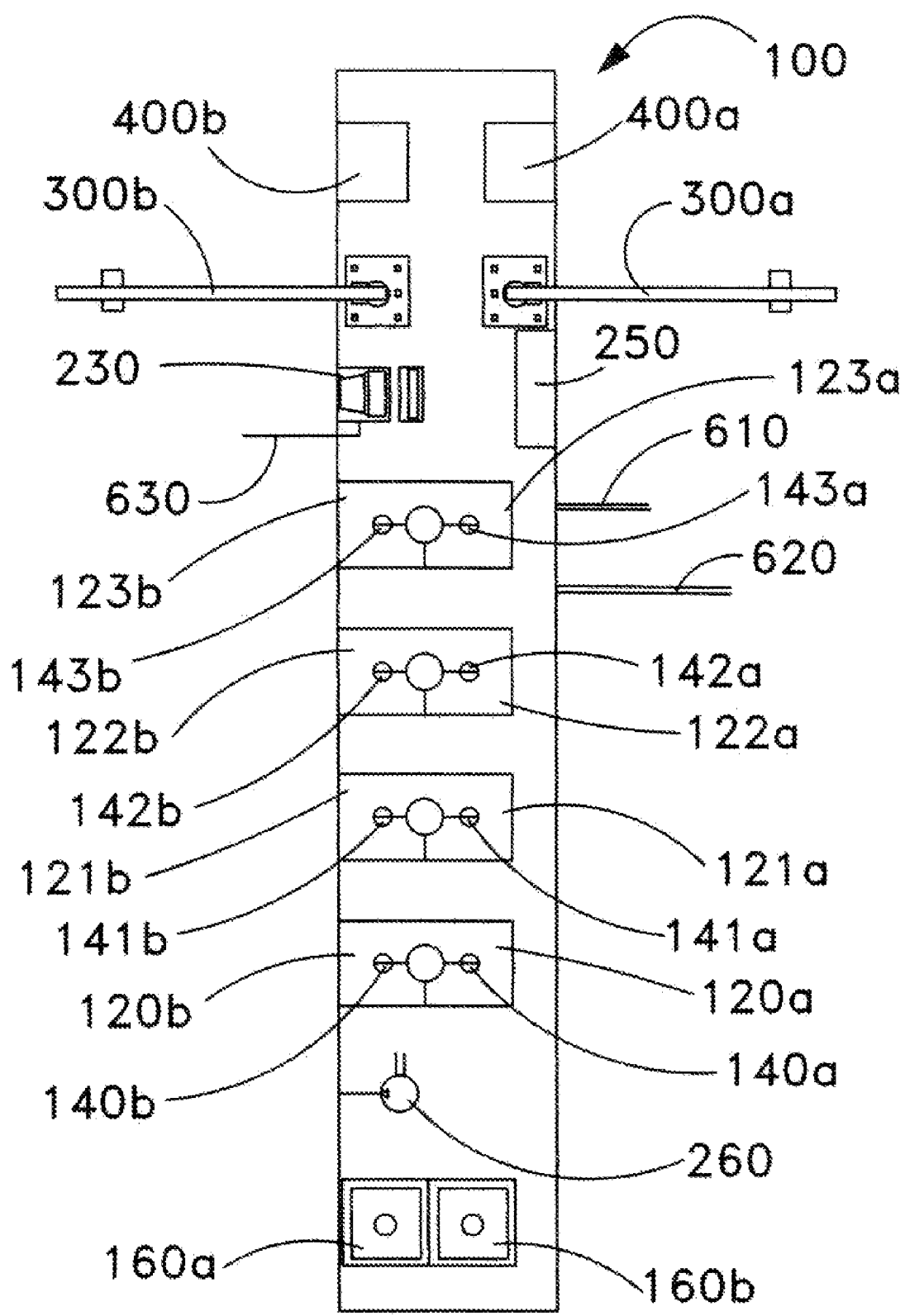
FIG. 1A shows an internal view of the color station.

Systems and methods for the advanced batching of liquid colorant for dispensing into loads of wet concrete are described. The systems and methods provide batches of liquid colorant to wet concrete contained in a concrete truck in an automated manner. The liquid colorant batches are mixtures of different colorants and water that produce a desired color in the resulting concrete.

The method includes placement of an order, processing the batch of the liquid colorant, and delivering the color batch to the truckload of wet concrete. Systems for implementing the methods are also described. In some embodiments of the invention, all of the steps are automated, requiring no manual intervention except for driving a concrete truck loaded with wet concrete to the color station. In other embodiments of the invention, some of the steps may involve manual intervention.

The system may be remotely deployed by a color station operator or by a central authority. This operator may be in another geographic region, for example in a distant state or city. The color stations are preferably located in close proximity to a ready-mix concrete plant or facility. Concrete providers may purchase batches of liquid colorant for their concrete using the color station, and receive the batch directly into their concrete truck in route to delivery of the concrete to the final customer or job site. The concrete provider need not purchase or obtain their own individual concrete coloring equipment to operate on its own site. Instead, the concrete provider may purchase concrete color products only as needed and receive them conveniently at the color station. Typically, the concrete truck will pick up the wet concrete from the ready-mix plant and then proceed to the color station to receive a batch of the liquid colorant, which should be ready or almost ready for pick up. In some cases, the batch of liquid colorant may be received prior to pick up of the wet concrete from the plant.

Other embodiments also include advanced batching of colorant products for delivery to a truckload of concrete. The term advanced batching includes the ability for the operator, dispatcher, or someone at their instruction to place the order with the owner/operator of the color station before the concrete truck arrives at the color station. Orders for colorant are stored by the remote color station in a pending orders database. Before the arrival of the concrete truck at the remote color station, the concrete truck is remotely sensed via a number of proximity detection processes described herein. As the color station detects the approaching concrete truck, the color station begins to process the order of the color batch for that particular concrete truck so that the color batch will be ready for the concrete truck or nearly ready for the concrete truck when the concrete truck arrives at the color station. Importantly, this minimizes the delay of the concrete truck as it delivers its concrete to the final customer. Wet concrete only has a limited window for application. An extended delay may result in the loss of the load of wet concrete.

The order placement of the method will now be described. The method begins with order placement. Order placement may be accomplished in a variety of manners. The order may be manually entered at the remote color station by a customer or by a remote color station attendant. Preferably, the order is communicated to the color station by the customer, a customer dispatcher or a central authority before the concrete truck arrives at the color station to reduce delay in receiving the batch of colorant. The central authority is generally the owner/operator of the color station. For example, communication of this order to the color station may be: (1) by a customer via a customer log-in to the central authority's web-site, (2) via communication to the remote color station by the customer dispatcher, or (3) via communication from a central server at the central authority.

Orders may be managed in an order and fulfillment database. The database may be located directly with a given remote color station or centrally in one database at the central authority which then distributes the orders to the correct color station's local databases.

Orders may also be placed manually by the concrete truck driver. In this case, orders are not placed in advance. Drivers create the order at the site of the color system via a user interface at the color station. This approach is the minimum feature set and will also serve as the back up approach should communication systems fail. The delay in delivery of product will be significant and little or no advance warning will be available if the order cannot be met with the available color product supply.

Preferably, orders are placed through the central authority, such as with the owner/operator of the remote color station. In this case, the customer places an order at least approximately 24 hours in advance via normal sales channels. The order gets logged into a central server queue as the order is received. The order information is transferred to the remote color station by the start of business the next day. Proximity detection processes or the manual entering of an order number at the color station begins the batch processing. If the order is initiated by manually entering the order number at the color station, then the customer must wait for completion of the batch at the remote color station site. Advanced placement of the order information can be used to determine product shortage in advance.

Orders may also be placed by the customer dispatcher. In this case, a customer dispatcher creates an order in the system via secure login to a web site managed by the owner/operator of the remote color station. The order entry immediately places the order in the queue for batch processing. Thus, the timing of the order is the responsibility of the customer dispatcher. This allows pre-processing of batches by the remote color station to minimize delays for product delivery. Instruction is preferably given to avoid queue delays with multiple dispatchers. Additionally, a customer is allowed to cancel a placed order. If the order is in active processing, the customer will be billed for the used product.

Orders may also be placed in a queue for automated batching using remote sensing technology. In this case, the customer places an order at least approximately 24 hours in advance via normal sales channels. The order gets logged into a central server queue. The customer truck may be detected using a wireless technique as it enters within a certain distance of the remote color station site. This allows pre-processing of batches to minimize delays for product delivery. The wireless technique may include cellular telephone calls, global positioning systems, radio transmitter systems, or other systems for transmitting location or detecting proximity.

The processing of the batch of liquid colorant will now be described. Due to the limited usable life of a truckload of wet concrete, the delivery of the batch of liquid color to the wet concrete must be timely. Wet concrete has a window approximately of thirty minutes to approximately 60 minutes before it starts to cure. A load of wet concrete that has begun to cure is often referred to as a "hot load" in the industry and will often be unusable for its intended application.

In order to increase the timeliness of delivery of the batch to a truckload of wet concrete, the batches are typically preprocessed to reduce the delay of the concrete truck entering order information and waiting for the order to be processed. The preprocessing is triggered by a variety of methods described below. The processing may be manually triggered by the truck driver at the site of the remote color station. It may also be triggered before the truck arrives at the remote color station by a proximity detection method. Proximity detection may be passive or active. Passive proximity detection methods include global positioning systems, long range one-way transponder devices, data modem transceivers, and Metropolitan Area Network ("MAN") communication devices, among others. Active proximity detection methods include web-based dispatch of order batching, and cellular telephone dispatch, among others.

In a preferred embodiment, the driver of the concrete truck will telephone the owner/operator at a toll-free telephone number and enter the order number. The order number is matched to an identification number in the color station database. The driver enters their estimated time of arrival at the color station. The delivery time in the color station database may be adjusted to accommodate the estimated time of arrival. Once proximity detection has occurred, the color batch is preprocessed and ready for delivery into the truck upon its arrival at the remote color station. The batch processing may take approximately three to twenty minutes, with most batch processing occurring in approximately five to eight minutes.

The physical and mechanical operations of the color station will now be described. In certain embodiments, the color station is based on a standard trailer and accommodates two batch processing systems. The trailer may be located on a leased site or other site of the owner/operator with sufficient access for one or two simultaneous dispensing operations into customer trucks. Site space should allow for separate entry and exit points as well as sufficient room for a queue of two concrete trucks in addition to the dispensing location.

The trailer comprises two mixing chambers and totes in fluidic communication with the mixing chambers. The system provides the capability to make simultaneous batches via the use of the two mixing chambers. Each tote preferably has its own pump.

In one embodiment of the invention, the trailer may contain two sets of four color totes, one set of attached waste totes, twelve pumps, a single internal control panel, two mixing chambers, and a two user interface panels mounted externally. For cold weather climates, an electric heater element may be mounted in the trailer to prevent color product from freezing prior to use.

The color product may be dispensed from the mixing chambers via booms containing hoses mounted to each side of the trailer. The booms may be at a height appropriate for dispensing color into standard ready-mix concrete trucks. Cameras adjacent to the booms may store a record of the truck receiving the color product. The record may be attached to the order number. Additional pumps may be needed to actively pump product from the mixing chambers up the height of the booms. Ports may be included on the outside of the trailer for refill of totes and unloading of waste totes.

A personal computer ("PC") may be used as the control processor for the system. It may be contained and durably mounted inside the trailer. A simple I/O device will act as a Graphical User Interface and be mounted on the outside of the trailer. The system may transfer batch control to a dedicated programmable logic controller ("PLC") rather than running the process on a PC.

A Graphical User Interface ("GUI") is mounted on the outside of the trailer. It may be kept simple and durable to minimize the effect of the interface as a failure mechanism. The primary function of the GUI is for order confirmation, confirmation of an "OK to pour" condition, and feedback on dispensing process. A receipt may be issued upon completion of the batch detailing amount of color dispensed, color type, date and time, location, and order number, among other information.

A read-out device mounted on the back of the trailer will illustrate which order number is available at which side of the trailer.

The maintenance of the color station will now be described.

The remote color station may be maintenance free on a non-failure basis for a period of six months. Components may be selected to meet this requirement. The operation of the present invention may include methods for periodic self-maintenance such as flushing lines and pumps to prevent failure after prolonged periods of non-use. Such periodic self-maintenance may be automatic.

The remote color station may self-test and detect failure or weaknesses where possible. Notification stating the maintenance condition may be sent to a central authority for further action. Daily agitation of material will occur to maintain optimum condition of the colorant.

The communication system of the color station will now be described. The remote color station will operate with regular communications to both a central authority as well as with customers.

The remote color station may communicate a variety of operational information to a central authority on a periodic basis. Such communication may include daily logs containing system status, customer orders, fulfilled orders, and product inventory. The communication from the remote color station may also notify the central authority of product shortages as compared to pre-determined threshold levels or as compared to the current order queue. The remote color station may also communicate with the central authority or local customers regarding the existence or potential for failure modes or an emergency shut down condition. The remote color station may also communicate to customers regarding confirmation that an order has been received, dispensed or manually received at the remote color station via local entry.

The remote color station may also communicate with the customer via various methods of proximity detection. The remote color station may optionally be capable of independently detecting the proximity of a target truck for an order to begin processing. The truck in this case must be electronically identifiable by order number.

Options for proximity detection include both passive and active methods. Passive methods of proximity detection include global positioning systems, long range one-way transponder devices, data modem transceivers, and Metropolitan Area Network ("MAN") communication devices, among others. Active proximity detection methods include web-based dispatch of order batching, and cellular telephone dispatch, among others.

The system also includes the GUI to manually enter an order in the case of loss of communication. The remote color station may be designed to handle and recover from a variety of failures. If the system suffers a loss of power due to any occurrence, a battery back-up may switch over allowing the current batch(es) to be completed and potentially released. Additionally, the battery back-up time may be used to send electronic notification to key parties, such as area customers, central authority, local sales, service personnel, that the system is running on back-up power.

The remote color station system will have an emergency stop control available. This may shut down all mechanical activities of the remote color station. The system may log the stop condition, time & date, and communicate a stop condition to a central authority. A proper recovery process may be followed to restore the system to operation.

The color station may include provisions to avoid an incorrect order entry or incorrect batch condition. Should an incorrect batch occur, the system may be allowed to dump the product to the waste tote for later disposal. The waste release may be logged. The order and batch process may then be allowed to continue as normal. In the case of multiple consecutive incorrect batches, communication of a maintenance condition and failure may be sent to the central authority and service personnel.

The color station may include provisions for tracking and advanced warning of low color product inventory. However, in the case of an order placement that cannot be met with current product, the order may not be accepted at the point of entry. A product shortage communication may be sent to the central authority and sales and service personnel. A method for manually verifying the inventory level of color product on each tote (dipstick or other simple level indicator) may be included for verification during restocking.

The methods and system will now be described with reference to the Figures. A color station 100 is shown in FIG. 1A. The color station 100 is built upon a standard trailer such as those hauled by a semi-truck. A trailer approximately forty feet by eight feet will suffice for most applications of the color station 100. The trailer contains and houses most of the components of the color station 100 to provide security and protection from the weather and elements. Since the color station 100 may be contained in a portable trailer, the trailer may be hauled from one job site to another job site or from location to location as desired. In other embodiments, the color station 100 may be incorporated into a permanent structure, such as a building or shed.

Figure 1B:
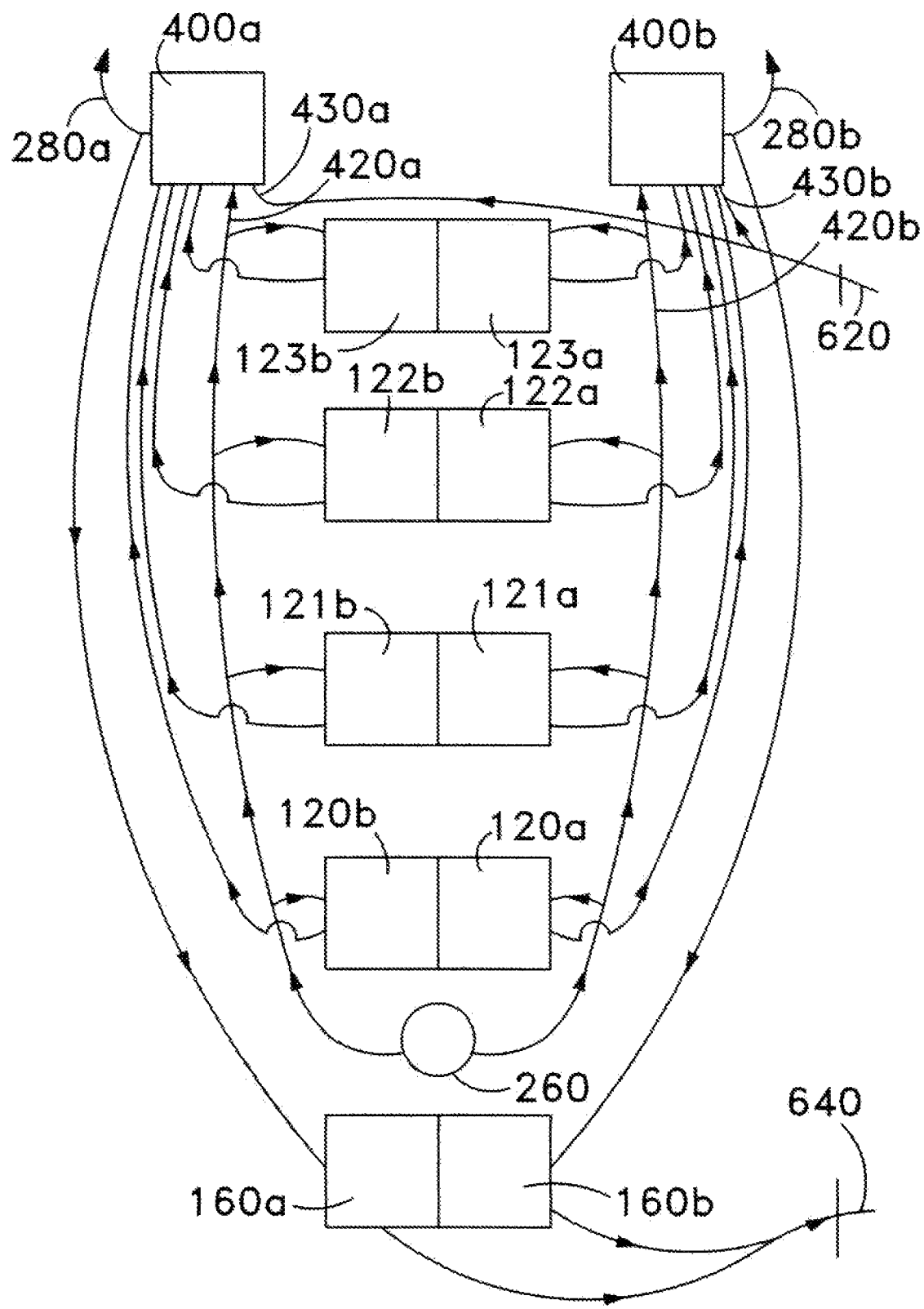
FIG. 1B shows a view of the fluid flows of the color station.
Figure 2:
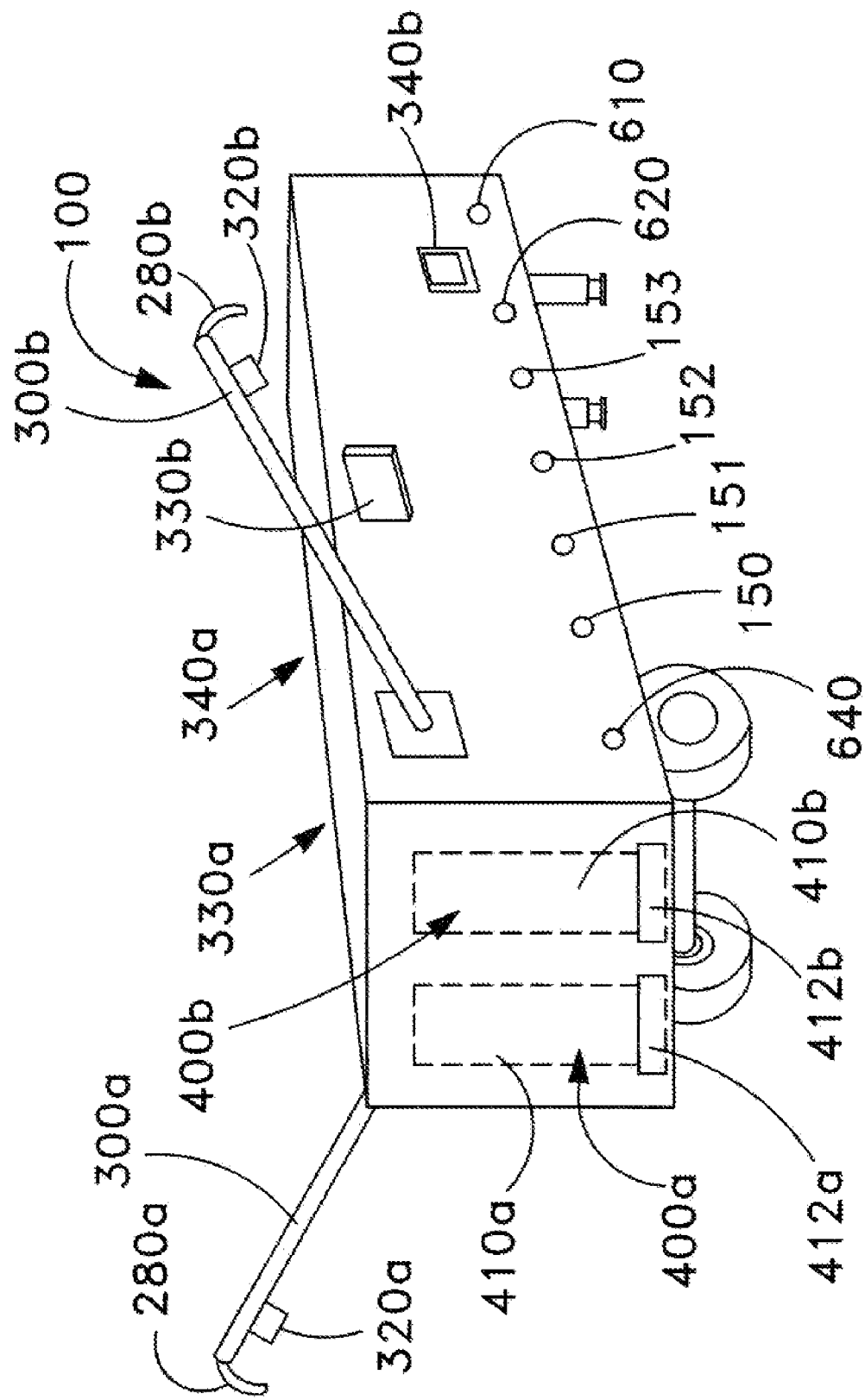
FIG. 2 shows an external view of the color station.

The site for the color station 100 requires electrical service, water service, and electronic data service. As further shown in FIG. 1, an electrical service 610 connects to the color station 100. A water supply 620 connects to the color station 100. A data supply 630 connects to the color station 100.

In this embodiment, the color station 100 includes eight totes that contain liquid colorant. In this embodiment, four of the totes contain the same colorant. The exemplary configuration of the color station 100 provides for the batching of two different liquid colorant batches. This allows the color station 100 to simultaneously serve two customers. The totes are separated into pairs of colorant totes that contain the same liquid colorant. For example, totes 120A and 1203 contain a first color. Totes 121A and 121B contain a second color. Totes 122A and 122B contain a third color. Totes 123A and 123B contain a fourth color.

Each of the eight totes include a pump for pumping the colorant to a respective weigh chamber. A pump 140A is in fluid communication via a hose with the tote 120A. A pump 140B is in fluid communication via a hose with a tote 120B. A pump 141A is in fluid communication via a hose with the tote 121A. A pump 141B is in fluid communication via a hose with the tote 121B. A pump 142A is in fluid communication via a hose with the tote 122A. A pump 142B is in fluid communication via a hose with the tote 122B. A pump 143A is in fluid communication via a hose with the tote 123A. A pump 143B is in fluid communication via a hose with the tote 123B. The respective pumps provide a particular weigh chamber with liquid colorant for example, the pumps 140A, 141A, 142A, and 143A supply a weigh chamber 400A via hoses connected between the pumps 140A, 141A, 142A, and 143A and the weigh chamber 400A. The pumps 140B, 141B, 142B and 143B supply a weigh chamber 400B via hoses connected between the pumps 140B, 141B, 142B, and 143B and the weigh chamber 400B. The weigh chambers 400A and 400B also receive water from the water supply 620. In another embodiment, a single pump may be utilized by each pair of totes.

A suitable pump for use with the present invention is a model SPX25 High Performance Hose Pump commercially available from Watson Marlow Bredel, which provides a flow of up to 11 gallons per minute and a discharge pressure of up to 232 pounds per square inch. The SPX25 Pump includes a one inch fitting for the incoming colorant hose from the respective tote and a one inch fitting for the colorant discharge hose from the pump to the respective weigh chamber.

The weigh chambers 400A and 400B receive the water and the liquid colorant. The weigh chamber includes receptacles 410A and 410B to receive the liquid colorant and the water. The colorants and water are combined in the receptacles 410A and 410B to form a batch of the liquid colorant. The receptacles 410A and 410B are mounted on a platform scales which measures the input of the water and the liquid colorant into the receptacles 410A and 410B. The receptacles 410A and 410B have inputs for each of the hoses from the totes. The weigh chambers 400A and 400B include four colorant inputs. The receptacle further has inputs for air 420A and 420B and water hoses 430A and 430B. Air and water are used to rinse the receptacles between colorant batches. An air compressor 260 is in communication via a hose with the air inputs 420A and 420B provides the air. The air compressor 260 is also in communication with each of the totes 120A-123A and 120B-123B to supply an air wand in each tote that agitates the liquid colorant in each tote. The weigh chambers 400A and 400B also include a pump to transfer fluids from the weigh chambers 400A and 400B.

The receptacles 410A and 410B of the weigh chambers 400A and 400B preferably have a volume of approximately 20 gallons to approximately 80 gallons. The receptacles 410A and 410B have a volume of 47 gallons. Preferably, the receptacles are made of a clear, semi-clear, or opaque plastic. This allows technicians to visually review the interior of the receptacles. The receptacles are further made of material that is chemically resistant to the liquid colorants.

A control and communication station 230 in conjunction with a logic and pump control panel 250 monitor and operate the function of the color station 100. The control and communication station 230 receives and send communications via the data source supply 630. The control and communication station 230 receives and stores the orders for batches to be processed. The control and communication station 230 may comprise a Windows based operating system and microprocessor with LCD monitor. The control and communication station 230 interacts with the logic and the pump control panel 250 to direct the various pumps to provide the weigh chambers 400A and 400B with the respective colorant and water. The pump control panel 250 includes a NEMA four enclosure main panel with remote Input/Output, two variable speed drives with reversing capability, (one pre-wired as a back-up), five motor starters, one 24 volt transformer, and one 140 volt transformer.

When the proximity detection systems confirm or activate the order, the control and communication station 230 initiates the batch processing. The control and communication station 230 initiates the pump control panel 250 to begin processing the batch. Depending upon the specific color and the amount of color selected by the customer for the batch of liquid colorant, the control and communication station 230 interacts with the logic and the pump control panel 250 to direct the various pumps 140A, 141A, 142A, and 143A to provide the weigh chamber 400A and with the proper amount of colorant from the respective totes 120A, 121A, 122A, and 123A and the appropriate amount of water.

The scales 412A and 412B associated with the weigh chambers 400A and 400B are in electrical communication with the control and communication station 230 that interacts with the logic and the pump control panel 250 to monitor the amounts of components in the weigh chambers 400A and 400B. After the batch of the liquid colorant is processed, it is pumped via a weigh chamber pump out of the color station 100 via boom hoses 280A and/or 280B attached to booms 300A and 300B for delivery to the concrete truck. The boom includes nozzles to direct the liquid colorant into the concrete truck. The booms 300A and 300B may include regulators to open or close the boom hoses 280A and 280B.

The weigh chambers 400A and 400B may simultaneously discharge the liquid colorant or the weigh chambers 400A and 400B may discharge the liquid colorant at different times. The boom hoses 280A and 280B split from a discharge hose leaving the weigh chambers 400A and 400B. The discharge hose also splits into a line that leads to the waste totes 160A and 160B. A valve in the discharge hose leaving weigh chambers 400A and 400B determines if the discharge fluid is directed to the boom hoses 280A, 280B or the waste totes 160A, 160B. The valve in the discharge hose is under the direction of the pump control panel 250 and the control and communication station 230.

The color station 100 further includes waste totes 160A and 160B. The waste totes 160A and 160B contain the liquids from the flushing and rinsing of the weigh chambers and the totes. The waste totes lead to the waste port 640 on the exterior of the color station 100. Refill ports 150, 151, 152, and 153 provide for the refilling of totes 120A-123A and 120B-123B with fresh liquid colorant. The refill ports 150, 151, 152, and 153 are in fluid communication with the totes 120A-123A and 120B-123B.

The exterior of the color station 100 will now be described. The boom 300A and the boom 300B provide for the transfer of the batched liquid colorant to the concrete trucks. The boom 300A is in fluidic communication with the weigh chamber 400A via the boom hose 280A. The boom 300B is in fluidic communication with the weigh chamber 400B via the boom hose 280B. Cameras 320A and 320B may be used to monitor and record the dispensing of the batch of colorant into the concrete trucks. LED display panels 330A and 330B provide status information to the concrete truck driver such as the dispensing of the liquid colorant batch has begun or the dispensing of the liquid colorant batch has ended. Graphical user interfaces 340A and 340B provide a manual entry system to provide a back-up or override for the proximity detection process.

In this embodiment, four pairs of totes are shown, however, the number of totes may be reduced or increased depending on the preference of the owner/operator. Four totes of liquid colorant generally provide a range for the preparation of liquid colorant batches necessary to satisfy most consumer needs. However, other embodiments may use 1 to 20 colorant totes. Further, the color station 100 includes the matched pairs of liquid colorant totes to provide for more economical and efficient operation since more than one concrete truck may be serviced at the same time, however, the color station 100 may include only one tote of each colorant, one boom, and one weigh chamber.

The color station 100 includes a liquid colorant of yellow, a first red, a second red, and black. The colorant totes preferably have a volume of approximately 200 to approximately 600 gallons. The color station 100 shows colorant totes with 400 gallon capacity.

Suitable colorants for the present invention are commercially available from Solomon Colors, Inc. of Springfield, Ill.

Solomon Colors Colorful™ Liquid Colors are predispersed iron oxide pigments containing high pigment solids in an aqueous base liquid.

Figure 3:
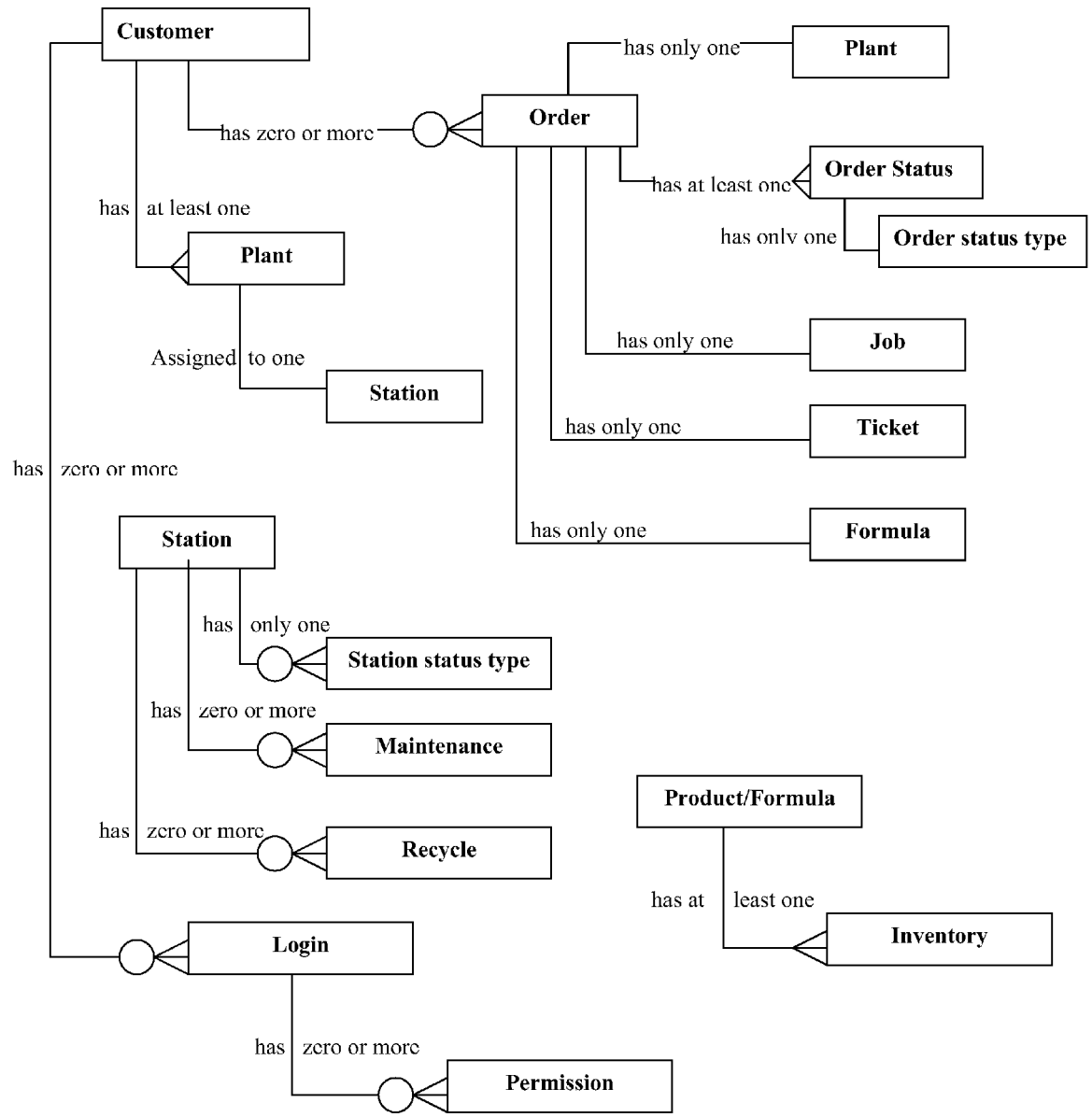
FIG. 3 shows a flow chart of the advanced color and batching process.

FIG. 3 shows a flow chart of the advanced color and batching process of one embodiment of the present invention. In order to initiate the process, a customer contacts the central authority system of the owner/operator for the color station. In this embodiment, a customer logs in at the owner/operator's secure website that is in communication with the central authority system. The customer inputs their customer identification, the desired color station to utilize, the desired color for the colorant batch, the cement content of the load of wet concrete, the size in yards of the load of wet concrete, and the date and time the order is to be fulfilled. Other pertinent transactional information may likewise be inputted. The central authority system of the owner/operator places the order from the website into a central database under a pending orders category. The central authority system provides the customer with an order number corresponding to the order placed via the web entry form after checking to determine if there is sufficient product available for the customer at the particular color station. If there is insufficient colorant in stock at the particular color station, then the customer is notified of this deficiency.

The central authority system next communicates the order to the local database at the color station. The order is maintained in a pending status in the database at the central authority system and in the local database at the color station until it is confirmed or cancelled by the customer.

In a preferred embodiment, the central authority place the order into a job stack residing at the local color station. The job stack includes a listing of all pending orders. Each order has a date and time to be fulfilled and a confirmation number associated with it. The color station will not batch the liquid colorant until the proximity detector is activated.

When the consumer is in route to the local color station, the customer confirms via one of the proximity detection methods described herein, such as calling a toll-free number at the central authority system. The central authority system then contacts the local color station. The local color station again checks the availability of the product and begins the processing of the color batch. The color batch is delivered to the concrete truck and the driver is provided with a receipt.

Figure 4:
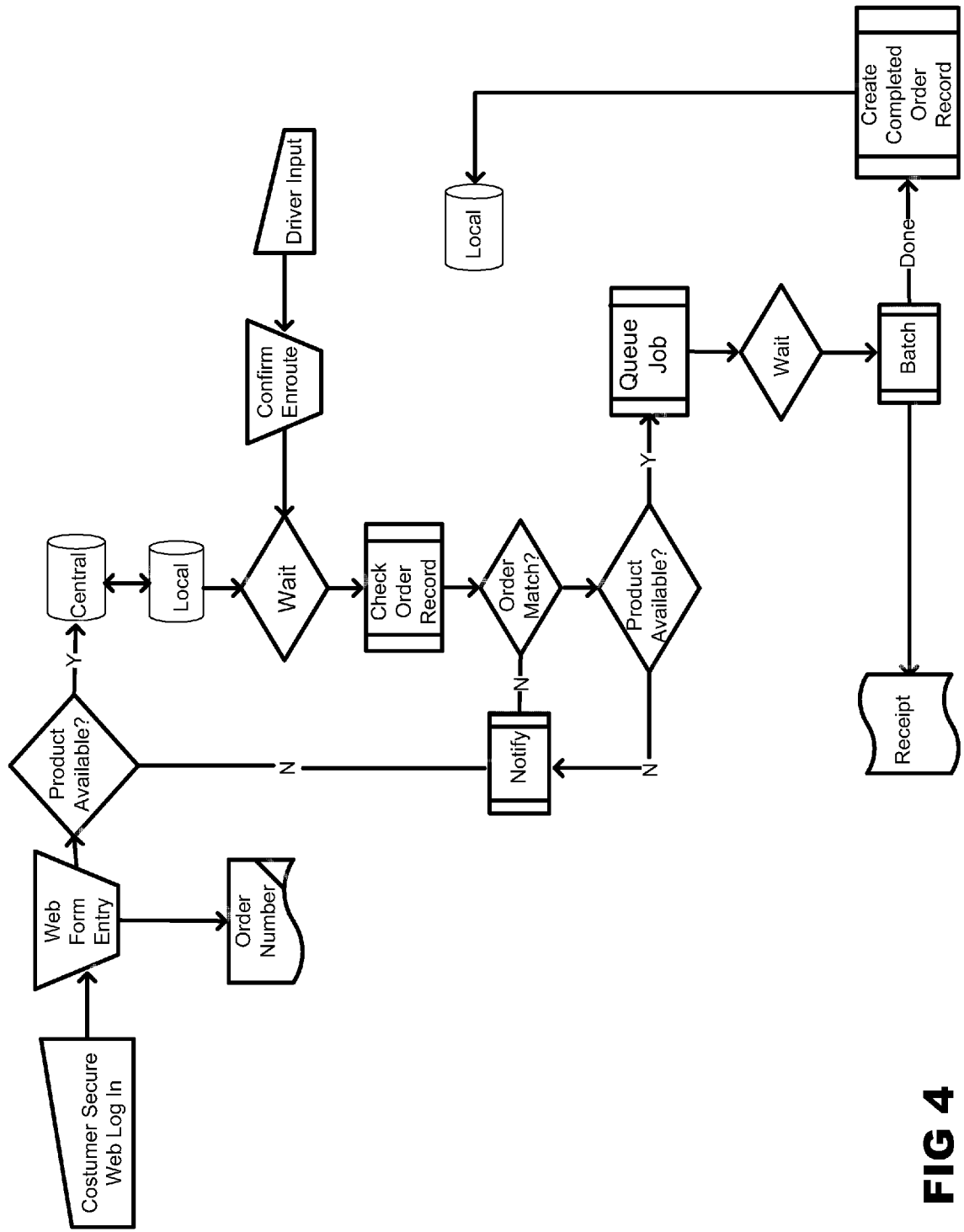
FIG. 4 shows a database entity relationship diagram.

A database entity relationship diagram for the present invention is shown in FIG. 4. Each customer has zero or more orders affiliated with it. A customer registered to use the system will not have an order until the customer places the order. The customer also has zero or more log-ins and zero or more permissions, such as password. This provides for multiple users for each customer to access the color station of the present invention. Each customer has at least one plant where the concrete is received.

Each plant is assigned to a color station in nearby proximity. Each color station has a status type, either operational or in-operational. Each station further has maintenance routines for inventory and cleaning. Each station further has a recycle routine for maintaining fresh pigments.

Each order is associated with only one plant. Each order has at least one status, such as cancelled, pending, confirmed, hold or completed. Each order has only one job, which is the customer's designation. Each order has only one ticket. Each order has only one formula, which is the specific color for the order.

The central authority will further maintain a database for monitoring the inventory of each color station. The central authority will monitor the supplies of each colorant at each color station.

Figure 5:
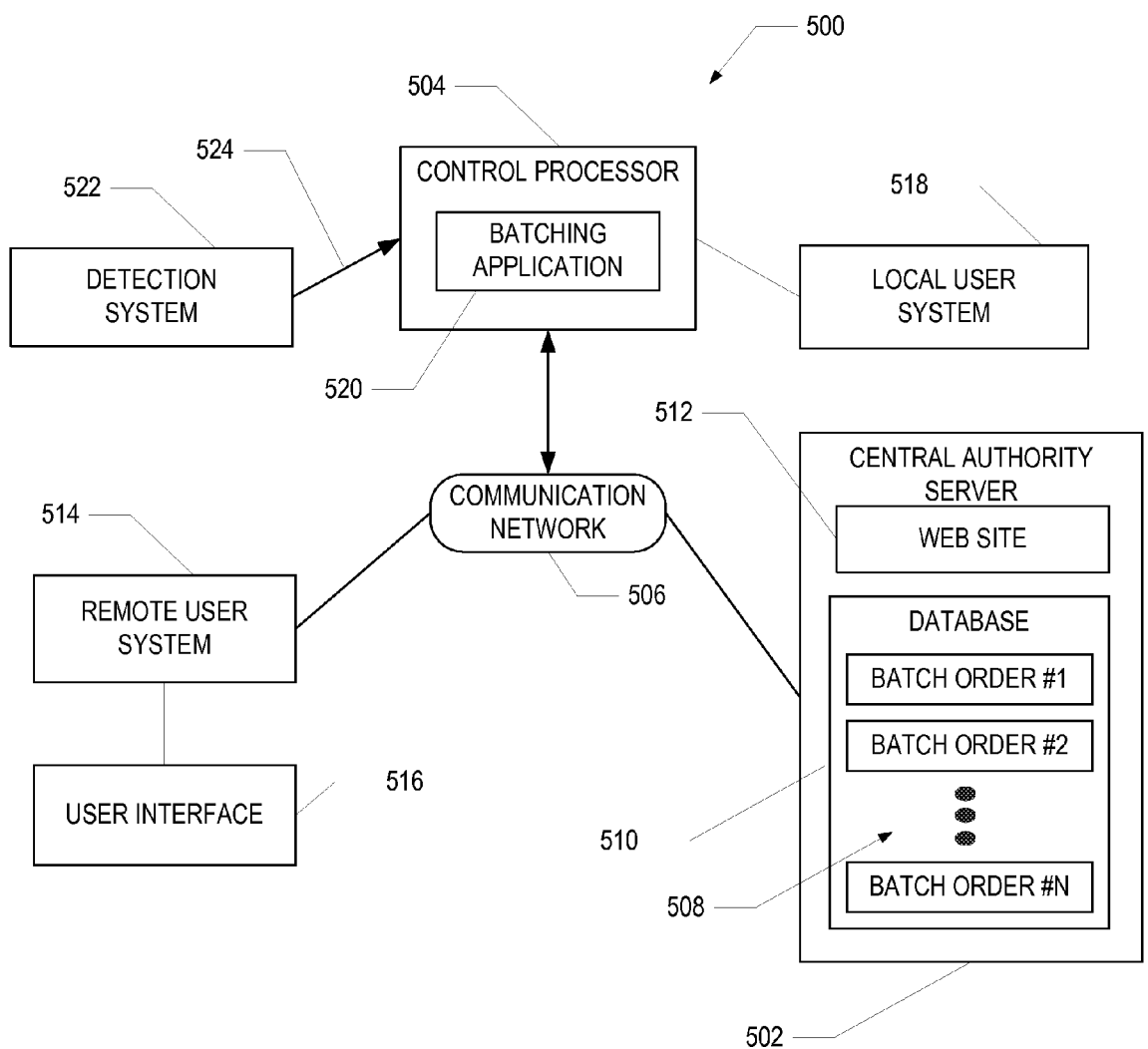
FIG. 5 shows a block diagram of the computerized batch system.

Referring now to FIG. 5, a batching system 500 for dispensing liquid colorant into loads of wet concrete is generally indicated in FIG. 5. The batching system 500 includes a central authority server 502 and a control processor 504. The control processor 504 communicates with the central authority server 502 over a communication network 506. The communication network 506 may be the Internet, an intranet, or another communication network. In this example, the server 502 and control processor 504 communicate using a Hyper Text Transfer Protocol ("HTTP").

In one embodiment of the invention, the control processor 504 communicates with the central authority server 502 to obtain batching orders 508 from a database 510. As described above, an order placement may be accomplished by a customer log-in to a central authority web site 512. For example, the customer may use a remote user system 514 such as a personal computer to communicate with the central authority server 502 via the communication network 506 to obtain a batch order form (not shown) from the central authority web site 512.

The central authority web site 512 is a software system that provides an on-line ordering service for customers via the communication network 506. For example, the customer may use a central authority web site 512 to interact with the batch order form to place an order for colorant. The customer can then use a user-interface (UI) 516 associated with the remote user system 514 to view and complete the order form. For example, the UI 516 may include a display, such as a computer monitor, for viewing the order form, and an input device, such as a keyboard or a pointing device (e.g., a mouse, trackball, pen, touch pad, or other device), for inputting data into the batch order form. The inputted data can include scheduling data that defines for example, an expected arrival time for the customer at a particular remote color station to receive the desired batch of colorant. After completing the form, the customer can use the UI 516 to submit the completed form back to the central authority server 502 to create a batch order 508 for a desired liquid colorant. The central authority server 502 stores the created batch order 508 in the database 510. Batch orders 508 in the database 510 may be grouped according to each particular remote color station, and may be sorted based on the expected arrival time of the customer at each particular remote color station. In other words, the database 510 can also serve as a central queue.

According to another embodiment of the invention, the control processor 504 obtains a batching order directly from a local user system 518 such as a personal computer. As described above, the customer dispatcher can create an order in the system via secure login to a web site managed by the owner operator of the remote color station.

A batching application 520 may be executed on the control processor 504 to schedule preprocessing of batch colorant and/or implement dispensing of the liquid colorant to a concrete truck. The batching application 520 may be executed in response to: (1) input received from a dispatcher via the local user system 518; (2) a signal received from an external detection system 522; or (3) schedule data included in the batching order 508.

Figure 6:
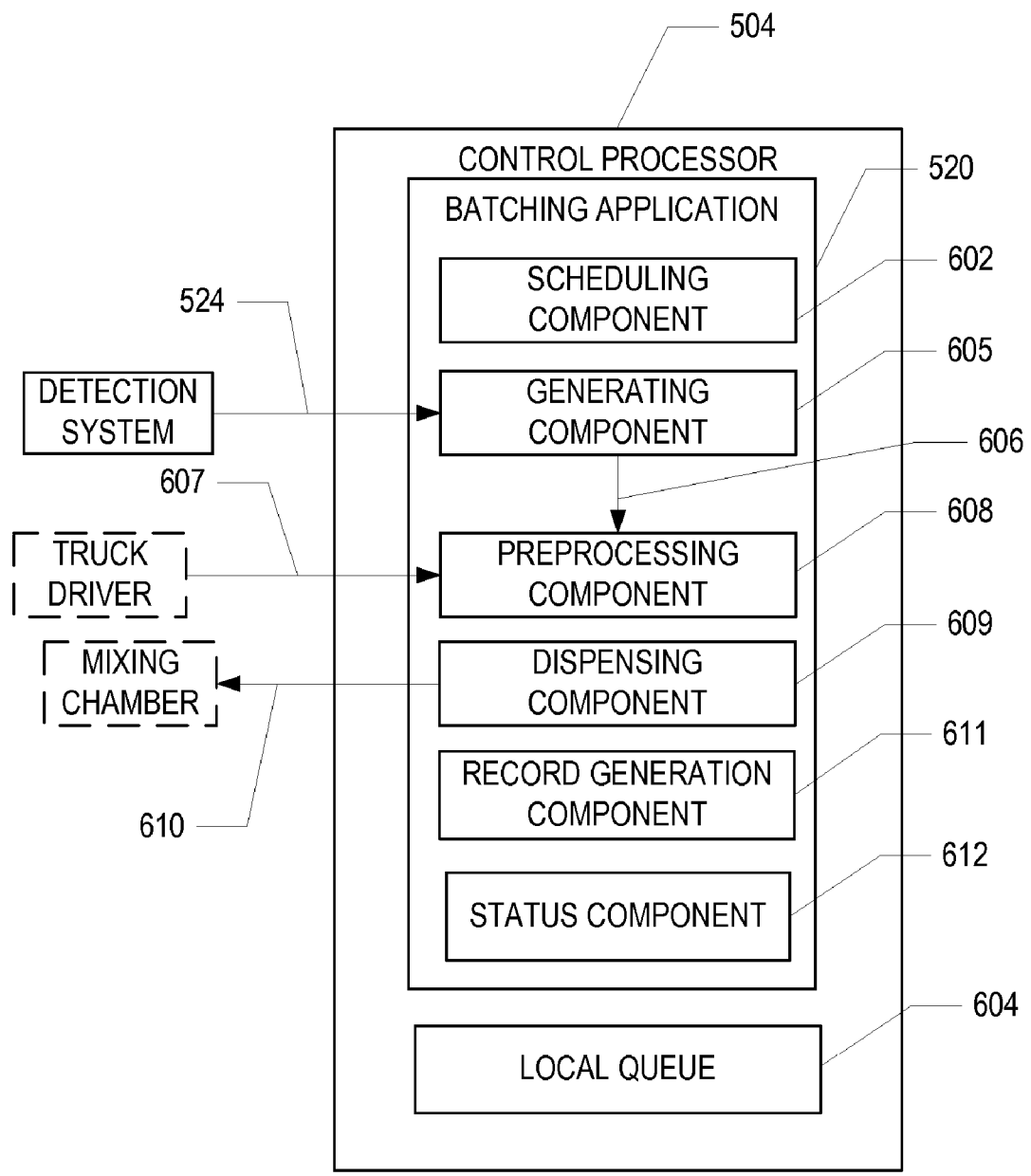
FIG. 6 shows a block diagram of the batching application.

FIG. 6 is a block diagram that depicts exemplary components of the batching application 520 according to one embodiment of the batching system 500. As described above, the batching application 520 can be executed to schedule preprocessing of the batch and/or implement dispensing of liquid colorant.

According to one embodiment, a batching application 520 being executed on the control processor associated with a particular remote color station retrieves a batching order 508 comprising scheduling data from the central authority server 502. In response to the received scheduling data, a scheduling component 602 determines the expected arrival time of the concrete truck and adds the batch order 508 to a local queue 604. The local queue 604 includes a list of batch orders for the particular remote color station. The list of batch orders are sorted based on the expected arrival time.

According to another embodiment, the batching application 520 receives a batching order 508 comprising scheduling data directly from customer dispatcher via the local user system 518. In response to the received scheduling data, the scheduling component 602 determines the expected arrival time and inserts the batch order into the local queue 604 based on the expected arrival time.

A generating component 605 generates a batch request 606 for a particular batch order 508 based on the expected arrival time as define by scheduling data that corresponds to that particular batch order 508. A preprocessing component 608 receives the batching request 606 (or manual batch request 607) and initiates preprocessing of the particular batch order at a predetermined period of time before the expected arrival time to reduce the delay of the concrete truck entering order information and waiting for the order to be processed. A dispensing component 609 generates a dispensing signal 610 in response to a command received from the local user system 518. The dispensing signal 610 is provided to mixing chambers to dispense the colorant to the truck.

As yet another option, the generating component 605 may generate the batch request 606 before the truck arrives at the remote color station by a proximity detection method (e.g., via the detection system). Proximity detection may be passive or active. Passive proximity detection methods include global positioning systems, long range one-way transponder devices, data modem transceivers, and Metropolitan Area Network ("MAN") communication devices, among others. Active proximity detection methods include web-based dispatch of order batching, and cellular telephone dispatch, among others. Alternatively, a manual batch request 607 can be generated or triggered manually by the truck driver at the site of the remote color station.

In another embodiment, the batching application 520 is configured to place a batch order 508 in the local queue 604 for automated batching after receiving a detection signal 524 from the detection system 522. The detection system 522 detects a customer truck as it enters within a certain distance of the remote color station site and generates the detection signal 524. The detection system 522 uses, for example, remote sensing technology that employs wireless techniques such as cellular phones calls, global positioning systems, radio transmitter systems, or other systems for transmitting location or detecting proximity of the customer truck. The scheduling component 602 receives the detection signal 524 and generates the batch request 606 for a particular batch order 508 that corresponds to the detected customer truck and initiates preprocessing of the particular batch order. In this particular embodiment, the customer places a batch order at least approximately twenty-four (24) hours in advance.

According to another embodiment, after dispensing the colorant into a concrete truck as described above in reference to FIG. 1A, the batching application 520 executes a record generation component 611 to create a record of the dispensing event. For example, the record generation component 611 may activate a camera adjacent to the booms to generate and store a photographic or video record of the truck receiving the colorant product. The record generation component 610 may further be associated the generated record to the order number.

According to another embodiment, the batching application 520 periodically executes a status component 612 to communicate a variety of operational information to the central authority. Such communication may include daily logs containing system status, customer orders, fulfilled orders, and product inventory. The communication from the remote color station may also notify the central authority of product shortages as compared to pre-determined threshold levels or as compared to the current order queue. The remote color station may also communicate with the central authority or local customers regarding the existence or potential for failure modes or an emergency shut down condition. The remote color station may also communicate to customers regarding confirmation that an order has been received, dispensed or manually received at the remote color station via local entry.

What is claimed is:

1. A method for providing a batch of liquid colorant, comprising:
   providing a color station that makes batches of liquid colorant;
   receiving an order from a customer for a batch of liquid colorant;
   placing the order in a database at the color station;
   detecting the customer approaching the color station to receive the batch of liquid colorant where the customer is detected by a proximity detection process of the color station;
   processing the batch of the liquid colorant at the color station after detecting the customer; and
   delivering the batch of liquid colorant to a concrete truck of the customer at the color station where the batch was processed.

2. The method according to claim 1, further comprising placing an order, wherein the order is placed by the customer, a customer dispatcher, or by a central authority that operates the color station.

3. The method according to claim 1, wherein the order for a batch of liquid colorant is stored by the color station in a pending orders database.

4. The method according to claim 1, wherein the processing is initiated by proximity detection.

5. The method according to claim 4, wherein the proximity detection is passive or active.

6. The method according to claim 5, wherein the passive proximity detection uses a global positioning system, a long range one-way transponder device, a data modem transceiver, or a metropolitan area network communication device, and the active proximity detection uses web-based dispatch or cellular telephone dispatch.

7. The method according to claim 1, wherein the concrete truck is remotely sensed via a proximity detection process of the color station before the concrete truck arrives at the color station.

8. A method for providing a batch of liquid colorant, comprising:
   providing a color station that makes batches of liquid colorant;
   receiving an order from a customer for a batch of liquid colorant;
   detecting a concrete truck of the customer approaching the color station to receive the batch of liquid colorant wherein the customer is detected by a proximity detection process of color station;
   processing the batch of the liquid colorant at the color station after detecting the concrete truck; and
   delivering the batch of liquid colorant to the concrete truck of the customer at the color station where the batch was processed, wherein the color station detects the approaching concrete truck, and then the color station begins to process the order of the batch of liquid colorant for the concrete truck such that the color batch will ready for the concrete truck or nearly ready for the concrete truck when the concrete truck arrives at the color station.

9. The method according to claim 1, wherein the order is received by a central authority and the order is communicated to the color station.

10. The method according to claim 1, wherein the order is received by a central authority, the order is logged into a central server queue, the order is transferred to the color station, and a proximity detection process or a manual entering of an order number begins the batch processing.

11. The method according to claim 1, wherein the central authority provides the customer with an order number, the customer contacts the central authority and enters the order number, and the order number is matched to an identification number in a database of the color station.

12. The method according to claim 1, wherein order information is used to determine product shortage in advance.

13. The method according to claim 1, wherein the color station is remotely controlled by a central authority.

14. A method for receiving order information and delivering a batch of liquid colorant, comprising:
providing a color station;
providing a central authority system that operates the color station remote in location to the central authority;
receiving order information from a customer for a batch of liquid colorant at the central authority system;
placing the order information into a central database as a pending order;
providing the customer with an order number corresponding to the order information;
communicating the order to a local database at the color station;
initiating processing of the batch of liquid colorant at the color station after receiving contact from the customer and detecting a concrete truck of the customer approaching the color station by a proximity detection process of the color station;
delivering the batch of liquid colorant to the concrete truck of the customer at the color station where the batch of liquid colorant was processed.

15. The method for receiving order information and delivering a batch of liquid colorant according to claim 14, wherein the the contact from the customer includes the customer logging into the central authority's website.

16. The method for receiving order information and delivering a batch of liquid colorant according to claim 14, wherein the receiving order information for a batch of liquid colorant includes receiving customer identification, the desired color station to utilize, the desired color for the colorant batch, the cement content of the load of wet concrete, the size in yards of the load of wet concrete, and the date and time the order is to be fulfilled.

17. The method for receiving order information and delivering a batch of liquid colorant according to claim 14, wherein the central authority system provides the customer with an order number corresponding to the order placed via a web entry form after checking to determine if there is sufficient product available for the customer at the color station.

18. The method for receiving order information and delivering a batch of liquid colorant according to claim 14, wherein the central authority communicates the order to the local database at the color station, and the order is maintained in a pending status in the database at the central authority system and in the local database at the color station until the order is confirmed or cancelled by the customer.

19. The method for receiving order information and delivering a batch of liquid colorant according to claim 14, wherein the central authority place the order into a job stack residing at the local color station.

20. The method for receiving order information and delivering a batch of liquid colorant according to claim 19, wherein the job stack includes a listing of all pending orders, and each order has a date and time to be fulfilled and a confirmation number associated with it.

21. The method for receiving order information and delivering a batch of liquid colorant according to claim 14, wherein the customer's pending arrival at the color station is confirmed via proximity detection, the central authority system contacts the local color station, the color station again checks the availability of the product and begins the processing of the color batch.

22. The method according to claim 14, wherein the color station is remotely controlled by the central authority.

23. A method for providing a batch of liquid colorant, comprising:
providing a color station operated by a central authority, wherein the color station prepares batches of liquid colorant;
receiving an order from a customer for a batch of liquid colorant at the central authority;
communicating the order to the color station;
detecting an approaching concrete truck by a proximity detection process of the color station and processing the batch of the liquid colorant at the color station such that the batch of liquid colorant will be ready or will be nearly ready for the concrete truck when the concrete truck arrives at the color station;
maintaining a database of customer order information and liquid colorant supply information; and
pumping the batch of liquid colorant into a customer's concrete truck at the color station where the batch of liquid colorant was processed.

24. The method according to claim 23, wherein the customer has zero or more orders affiliated with the customer and the customer has at least one plant where the concrete is received.

25. The method according to claim 23, wherein a concrete plant is assigned to a color station in nearby proximity.

26. The method according to claim 23, wherein the color station has a status type of operational or inoperational.

27. The method according to claim 23, wherein each order is associated with only one plant and each order has at least one status.

* * * * *